United States Patent
Baccichet

(10) Patent No.: US 10,284,613 B2
(45) Date of Patent: May 7, 2019

(54) STREAMING OF VARIABLE LENGTH CONTENT SEGMENTS

(71) Applicant: Dropbox, Inc., San Francisco, CA (US)

(72) Inventor: Pierpaolo Baccichet, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 702 days.

(21) Appl. No.: 14/242,808

(22) Filed: Apr. 1, 2014

(65) Prior Publication Data

US 2015/0237090 A1   Aug. 20, 2015

Related U.S. Application Data

(60) Provisional application No. 61/941,410, filed on Feb. 18, 2014.

(51) Int. Cl.
G06F 15/16 (2006.01)
H04L 29/06 (2006.01)
H04L 29/08 (2006.01)

(52) U.S. Cl.
CPC ........ H04L 65/4084 (2013.01); H04L 65/602 (2013.01); H04L 65/608 (2013.01); H04L 67/30 (2013.01)

(58) Field of Classification Search
CPC .................................................. H04L 65/4084
See application file for complete search history.

(56) References Cited

U.S. PATENT DOCUMENTS

| 9,030,609 | B1* | 5/2015 | Yeung | H04N 5/38 348/525 |
| 9,112,943 | B1* | 8/2015 | Vulkan | H04N 21/8352 |
| 2005/0183127 | A1* | 8/2005 | Ngo | H04N 7/17336 725/90 |
| 2011/0061086 | A1 | 3/2011 | Huang | |
| 2011/0080958 | A1 | 4/2011 | Srpljan et al. | |

(Continued)

OTHER PUBLICATIONS

Lee, S-B. et al., "Performance-Aware Replication of Distributed Pre-Recorded IPTV Content," IEEE Transactions on Broadcasting, Jun. 2009, pp. 516-526, vol. 55, No. 2.

(Continued)

*Primary Examiner* — Moustafa M Meky
*Assistant Examiner* — Sm Zakirul Islam
(74) *Attorney, Agent, or Firm* — Fenwick & West LLP

(57) ABSTRACT

A content management system streams variable length segments of content items to client devices. The content management system stores a content item and makes the item available for access by one or more client devices. When a client device requests the content item from the content management system, the content management system sends the content item to the device by streaming the content item in segments. Specifically, the content management system partitions the content item into a sequence of variable length segments. An initial portion of the sequence includes rapid start segments that are configured as being the smallest segments in length from the sequence. A subsequent portion of the sequence includes the remaining segments having longer length(s). The content management system streams the segments to the client device in sequential order and in a streaming format.

19 Claims, 3 Drawing Sheets

(56) References Cited

U.S. PATENT DOCUMENTS

| | | | | |
|---|---|---|---|---|
| 2011/0271092 A1* | 11/2011 | Brelay | ................. | G11B 27/005 |
| | | | | 713/150 |
| 2012/0183235 A1* | 7/2012 | Sasai | ................... | H03M 7/4018 |
| | | | | 382/233 |
| 2013/0262633 A1 | 10/2013 | Goodwin et al. | | |
| 2013/0283301 A1* | 10/2013 | Avedissian | ....... | H04N 21/44016 |
| | | | | 725/5 |
| 2013/0297679 A1* | 11/2013 | Kim | ................... | H04N 21/2343 |
| | | | | 709/203 |
| 2014/0230009 A1* | 8/2014 | Subramani | .......... | G06F 21/6218 |
| | | | | 726/1 |
| 2015/0189339 A1* | 7/2015 | Sood | ................. | H04N 21/2401 |
| | | | | 725/32 |

OTHER PUBLICATIONS

Yu, H-F. et al., "Efficient Periodic Broadcasting for Mobile Networks at Small Client Receiving Bandwidth and Buffering Space," Journal of Applied Mathematics, 2013, 10 pages.

* cited by examiner

STREAMING OF VARIABLE LENGTH CONTENT SEGMENTS

This application claims the benefit of provisional application 61/941,410, filed on Feb. 18, 2014, which is incorporated by reference herein in its entirety.

BACKGROUND

1. Field of the Embodiments

The embodiments pertain in general to content management systems, and more specifically to a content management system streaming variable length media segments to client devices.

2. Description of the Related Art

Content management systems enable users to access content items from multiple client devices. A user provides content items, such as videos or audio files to a content management system for storage. At any point, the user or another user with permission may request to access a stored content item from the content management system. When such a request is made for a content item that is adapted for streaming, the content management system typically streams the content item to the user's client device so that the client device can start playing the content item as it receives data segments of the content item. However, there is a delay between when the user requests the content item and when the content item starts playing on the user's client device. Some of the factors that contribute to the delay include processing performed by the content management system to be able to stream the content item, the amount of time it takes data segments to travel from the content management system to the user's client device, and the client device waiting to receive sufficient data from the system in order to be able to start playing. Waiting for the content item to start playing can cause the user to become frustrated and have an unsatisfactory experience.

BRIEF SUMMARY

A content management system streams variable length segments of content items to client devices. When a content item is uploaded to the content management system for storage, the content management system stores the content item. The content item is made available for access by one or more client devices.

When a client device requests the content item from the content management system, the content management system sends the content item to the device by streaming the content in segments. Specifically, the content management system partitions the content item into a sequence of multiple, variable length segments. An initial portion of the sequence includes rapid start segments that are configured as being the smallest segments in length from the sequence, and a subsequent portion of the sequence includes the remaining segments having longer length(s). The rapid start segments may be, for example, the first two segments in the sequence. The content management system streams the segments to the client device in sequence and in a streaming format. Accordingly, the client device first receives the rapid start segments, and then receives the remaining segments. Since the initial rapid start segments are the shortest in length, the client device is able to decode them rapidly and start playback of the content item based on these segments almost immediately. This improves the quality of the user experience.

Features and advantages described in this summary and the following detailed description are not all-inclusive. Many additional features and advantages will be apparent to one of ordinary skill in the art in view of the drawings, specification, and claims hereof.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
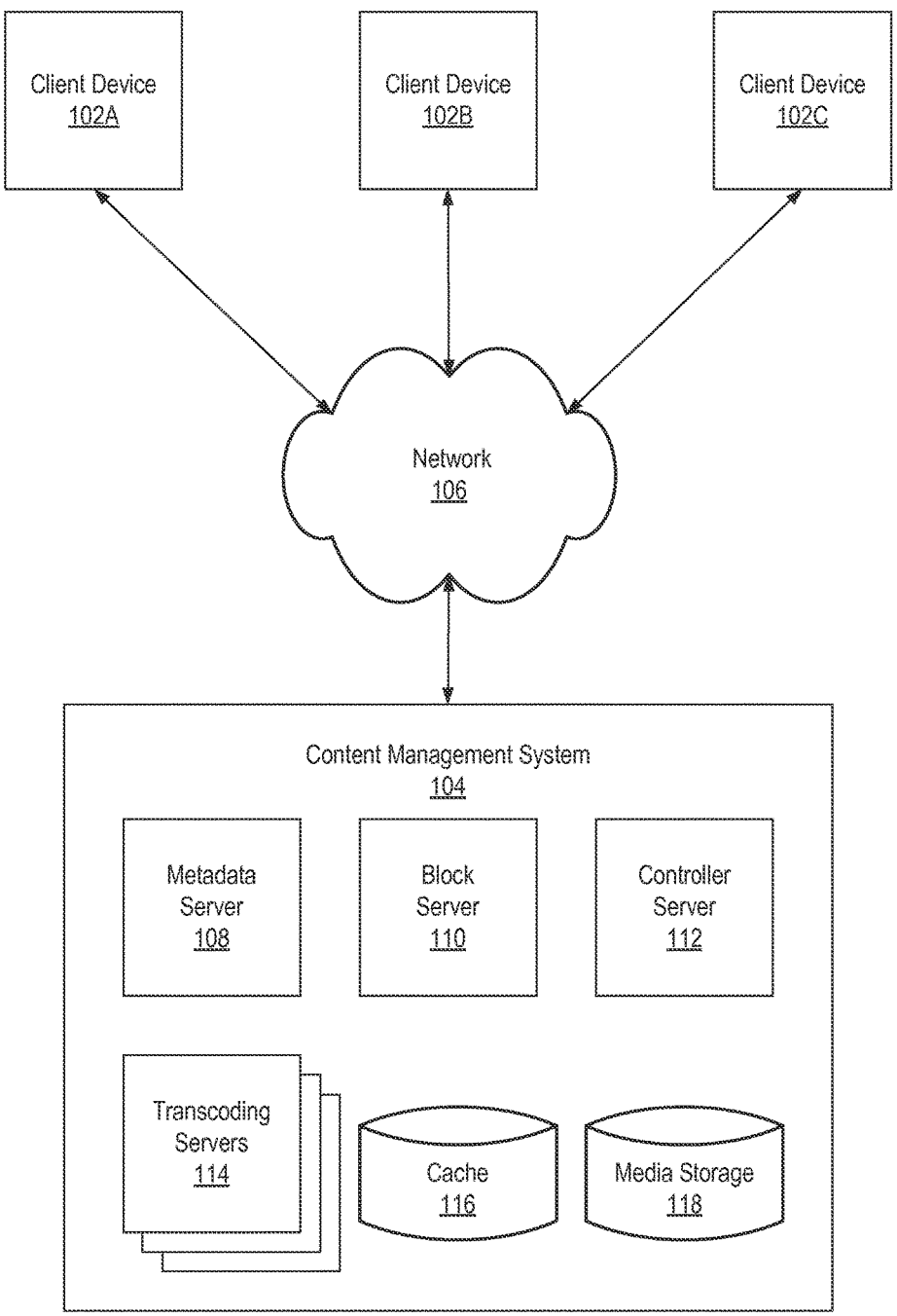
FIG. 1 is a block diagram of a content management system environment according to one embodiment.

FIG. 1 is a block diagram of content management system environment 100 according to one embodiment. Environment 100 includes client devices 102A, 102B, and 102C, and content management system 104 connected to network 106. Although illustrated environment 100 only includes three client devices 102, other embodiments include additional client devices 102 (e.g., thousands of client devices).

FIG. 1 and the other figures use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral.

Network 106 enables communication among the entities connected to it. In one embodiment, network 106 is the Internet and uses standard communications technologies and/or protocols. Thus, network 106 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, etc. Similarly, the networking protocols used on network 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 106 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Each client device 102 is a computer system capable of communicating with content management system 104 via network 106. Client device 102 may be, for example, a personal computer, a mobile phone, a tablet, a personal digital assistant (PDA), or a television set-top box. Through client device 102 users of content management system 104 can send/upload content items to content management system 104 for storage. A content item includes digital data, audio, video, images, documents, text, etc. Additionally, a content item can include a folder or other mechanism of grouping content items together with difference behaviors, such as collection of content items, playlists, albums, etc. Certain types of content items are configured to be streamed, such as audio and video files. Streaming generally allows the receiving device, such as client device 102, to output ("playback") the content item before the entire contents of the item are received.

Additionally, through client device 102 users can request to access content items stored by content management system 104. A user can request to access a content item using, for example, a user interface provided by content management system 104 or a link (e.g., a uniform resource locator) generated by system 104 for accessing the item.

When client device 102 sends a request to the content management system 104 to access a content item, client device 102 loads a media player. The media player presents the requested content item as it is streamed by content management system 104 to client device 102. In one embodiment, the media player starts playback of a content item being streamed once it has received the initial portion/rapid start segments (e.g., first two segments) of the item from content management system 104.

Content management system 104 is a computer system that allows users to provide content items for storage and allows users to access stored content items. Therefore, from client device 102 a user may, for example, upload a content item to system 104 for storage and at a later time the content item may be accessed from the same or a different client device 102 operated by the same or a different user.

Each user that registers with content management system 104 has an account with system 104. A registered user can upload content items to system 104 for association with his account. The user can organize the items associated with his account into different folders. Further, the user can allow/give permission to other users to access content items associated with his account. To allow other users to access a content item, the user can share with the other users a share link that provides direct access to the content item. The user can also share with other users a folder that includes multiple content items uploaded by the user to his account. The users with whom the folder was shared can access the content items included in the folder. Additionally, the users can upload content items to include in the shared folder.

When a user requests to upload a content item for storage and association with an account, content management system 104 receives the content item from the user's client device 102. Content management system 104 stores the item in an original format. In one embodiment, the original format is a non-streaming format. In one embodiment, the original format is the format in which client device 102 uploaded the item to the system 104.

When client device 102 requests the stored content item from content management system 104, content management system 104 sends by streaming to client device 102 segments into which the content item has been partitioned. Content management system 104 partitions the item into an ordered sequence of multiple segments. The order of the segments is according to the order in which the segments are presented by a media player. For example, the first segment in the sequence is presented first and the last segment in the sequence is presented last.

The item is partitioned so that the segments in the sequence are not all the same length (i.e., the length of the segments varies). The length of a segment may refer, for example, to its duration, number of frames, playback time, or size (e.g., number of bytes). An initial portion of the sequence comprises a predetermined number of the initial segments configured to be smaller in length than the other segments in the sequence. For example, the initial segments in the sequence may each have a playback time/duration of 2 seconds, while the other segments in the sequence may have a playback time of either 3, 4 or 5 seconds. These initial segments are referred to as the rapid start segments. In one embodiment, the number and length of the rapid start segments is determined by the operator of content management system 104, and can be based on file format used for the content items, the performance characteristics of the codec(s) available on client device 102, the latency or other transmission characteristics of network 106. Preferably, the number and length of the rapid start segments are selected to allow client device 102 to rapidly decode and start playback of the content item with a minimal amount of delay from the time client device 102 requests the content item from content management system 104. For example, instead of two, two-second rapid start segments, four one-second segments may be used. In one embodiment, content management system 104 dynamically determines the number and length of the rapid start segments based on the characteristics of client device 102 (e.g., device type, available codecs, player application) and/or network characteristics, and file format of the content item.

Content management system 104 streams the segments to client device 102 in sequence and in a streaming format. Since the rapid start segments are small in length and the media player of client 104 device only needs these segments to start playback of the item, client device 102 is able to quickly receive the segments from system 104, decode them and start playback of the item. The length of the other segments in the subsequent portion of the sequence is such that they are longer in length than the rapid start segments but the player can still receive these segments fast enough to prevent the player from stopping or stuttering during playback.

In one embodiment, content management system 104 partitions the content item and transcodes at least some of the segments from the original format to the streaming format prior making the item available to client devices 102 for access. In another embodiment, system 104 partitions the item and transcodes the segments when the request for the item is received from client device 102.

A streaming format is a format that is appropriate for streaming a content item to client device 102 that requests the content item. A streaming format may be, for example, .3gp, .3gpp, .3gpp2, .asf, .avi, .aac, .dv, .flv, .m2t, .m4v, .mkv, .mov, .mp4, .mpg, .mpeg, .mts, .oggtheora, .ogv, .rm, .ts, .vob, .webm, .wmv, and H.264.

As illustrated in FIG. 1, content management system 104 includes metadata server 108, block server 110, controller server 112, transcoding servers 114, cache 116, and media storage 118. Those of skill in the art will recognize that other embodiments of content management system 104 can have different and/or other components than the ones described here, and that the functionalities can be distributed among the components in a different manner. While components of content management system 104 are described as separate computer servers, in other embodiments each of these servers may be implemented as a module of a single server.

Metadata server 108 processes requests received from client devices 102 regarding content items and is one means for performing this function. In one embodiment, upon request from a user having an account with system 104, metadata server 108 provides a user interface to client device 102 that allows the user to see different content items associated with the user's account. In one embodiment, prior to providing the user interface, metadata server 108 requires that the user provide authentication information (e.g., a login and password) associated with the account.

Through the user interface, the user can request to upload new content items for storage and can request to access stored items associated with the user's account. When the user requests to upload a content item for storage, metadata server 108 receives from user's client device 102 the content item and metadata associated with the item. In one embodiment, the content item is received in an original format. In one embodiment, the metadata associated with the item includes one or more of the following: the name of the content item, an indication as to one or more accounts with which the item should be associated, a folder in which the item is to be included, and an indication as to the user that requested the upload.

Metadata server 108 forwards the content item and the metadata to block server 110 for storage in media storage 118. Media storage 118 stores content items in the original format. Metadata server 108 additionally determines whether to transcode a portion of the content item from the original format to a streaming format prior to making the item available for access by one or more client devices 102. The process of transcoding prior to making a content item available for access is referred to as "pre-transcoding" herein. In one embodiment, metadata server 108 is set to pre-transcode a portion of every content item that is uploaded. In another embodiment, metadata server 108 is set so that no uploaded content item is pre-transcoded.

In another embodiment, metadata server 108 determines whether to pre-transcode based on one or more of the following factors: a type of the item (e.g., video, audio, etc.), the total length of the item (e.g., only items longer than a threshold length), internal codec type, size of the item, characteristics of the uploading user (e.g., a type of account the uploading user has or the amount of usage of system 104 by the user), and whether the item includes media that is streamed to requesting client device 102. As an example, metadata server 108 determines to pre-transcode a portion of the content item if the uploading user has an upper-tier account for which a subscription fee is paid and the item includes video content. As another example, metadata server 108 determines to pre-transcode if the file size of item is greater than a threshold size.

Based on the determination as to whether to pre-transcode a portion of the content item, metadata server 108 updates an item table. The item table includes an identifier for each content item that has been uploaded to system 104 for storage, an indication as to whether the content item has been pre-transcoded, and an indication as to which segments of the item have been pre-transcoded if applicable. If a determination is made not to pre-transcode the uploaded content item, metadata server 108 updates the item table to indicate that the item has not been pre-transcoded.

On the other hand, if metadata server 108 determines to pre-transcode a portion of the item, metadata server 108 determines which portion of the item to pre-transcode. In one embodiment, the determined portion is less than the total length of the content item (i.e., the determined portion does not include the entire content item). For example the determined portion may be the first 10 seconds of the content item. In another embodiment, the determined portion may include the entire content item.

In one embodiment, metadata server 108 determines to pre-transcode a fixed portion of the content item set by a system administrator. For example, for each content item that is to be pre-transcoded, metadata server 108 determines to pre-transcode the first 30 seconds. As another example, metadata server 108 determines to pre-transcode 30% of each content item that is to be transcoded. In one embodiment, the metadata server 108 determines to pre-transcode the rapid start segments.

In one embodiment, metadata server 108 determines the portion of the content item to pre-transcode based on a determined sample time. The sample time is determined by metadata server 108 based one or more of the following factors: an estimated amount of time it would take to transcode a sample segment of the item of a specific size, an estimated sending time of the segment from the system 104 to a client device 102, and an estimated amount of time it would take an average client device 102 to start playback of the segment once it is received by device 102. In one embodiment, the portion of the content item that is pre-transcoded is equal to the sample time multiplied by a factor. For example, if the sample time is one second and the factor is 10, metadata server 108 determines to transcode the first 10 seconds of the content item.

Metadata server 108 sends a request to controller server 112 to partition the content item into variable length segments and select a transcoding server 114 to pre-transcode from the original format to the streaming format segments of the item that correspond to the determined portion. Metadata server 108 receives a notification from selected transcoding server 114 once the corresponding segments have been pre-transcoded and stored in cache 116. The notification indicates which segments have been pre-transcoded. Cache 116 stores pre-transcoded segments of content items. When metadata server 108 receives the notification, metadata server 108 updates the item list to indicate that the content item has been pre-transcoded and which segments were pre-transcoded.

Through the user interface provided by metadata server 108 or through a link, a user can request to access a content item stored by content management system 104. For example, through a user interface (e.g., a web interface or mobile application), a user can request that a content item associated with the user's system account be streamed and/or downloaded to the user's device 102. As another example, a user can activate a share link that causes the user's device 102 to automatically request a content item from system 104 or directs device 102 to an interface through which the user can request the item.

When a user requests a content item, metadata server 108 analyzes its item table to determine whether a portion/segments of the content item have been pre-transcoded. If segments of the content item have not pre-transcoded, metadata server 108 sends a request to controller server 112 to partition the content item into variable length segments and select a transcoding server 114 to transcode from the original format to the streaming format all segments into which the item is partitioned.

If segments of the content item have been pre-transcoded, metadata server 108 determines which segments have been pre-transcoded. If not all the segments of the content item have been pre-transcoded, metadata server 108 sends a request to controller server 112 to select a transcoding server 114 to transcode to the streaming format the remaining segments that were not pre-transcoded. If all the segments of the item were pre-transcoded, there is no need for metadata server 108 to request transcoding from controller server 112.

Metadata server 108 generates a token that includes an identifier of the content item and a value indicating the segments of the content item that were pre-transcoded. In one embodiment, if the item was not pre-transcoded, the value is equal to zero in order to indicate that no segments of the item have been pre-transcoded. If metadata server 108 requested that controller server 112 select a transcoding server 114 to transcode one or more segments, metadata server 108 also includes in the token an identifier associated with transcoding server 114 selected by controller server 112. The identifier of selected transcoding server 114 is received by the metadata server 108 from controller server 112.

Metadata server 108 sends the generated token to client device 102 used by the user to request the content item. As described in more detail below, the token is used by client device 102 to request the content item from block server 110.

Block server 110 stores uploaded content items and sends segments of requested content items to client devices 102, and is one means for performing this function. When a content item is uploaded by a client device 102 for storage, block server 110 stores the content item in media storage 118 along with the metadata provided with the item. Block server 110 stores the content item in storage 118 in an original format.

As described above, when a user requests a stored content item, metadata server 108 provides a token to user's client device 102 that includes an identifier of the content item, a value indicating segments of the content item that have been pre-transcoded, and if applicable an identifier of a transcoding server 114 selected for transcoding. A media player loaded on client device 102 requests the content item from block server 110. In the request the media player includes the token provided by metadata server 108. Based on the token, block server 110 determines whether segments of the content item have been pre-transcoded to the streaming format. If segments have been pre-transcoded, block server 110 retrieves the pre-transcoded segments from cache 116 and sends the pre-transcoded segments in sequence to the media player for presentation.

If the token includes an identifier of a transcoding server 114 selected to transcode one or more segments of the item, as selected server 114 transcodes segments of the content item, block server 110 obtains the segments from server 114 and provides them to the media player in sequence. Through this process all segments of content item are streamed to the media player.

Controller server 112 partitions content items and selects transcoding servers 114 for processing transcoding requests and is one means for performing this function. When controller server 112 receives a request from metadata server 108 to partition a content item into multiple segments, controller server 112 identifies the item in the media storage 118. Controller server 112 partitions the content item into an ordered sequence of multiple segments. The sequence of the segments is according to the order in which the segments are to be presented by a media player (playback order).

As described above, the lengths of the segments in the sequence vary, and include a predetermined number of rapid start segments in an initial portion of the sequence. The controller server 112 partitions the media segment in such a way that the rapid start segments can be quickly received by a client device 102 and so that the subsequent portion including the subsequent segments are longer in length than the rapid start segments but can still be received by device 102 fast enough as to not interrupt playback of the item. In one embodiment, controller server 112 partitions the media segment according to a partitioning profile. In one embodiment, the partitioning profile is set by a system administrator/controller. The same partitioning profile may applied to each content item, or alternatively, controller server 112 stores multiple partitioning profiles and selects a profile to use for partitioning a given content item. Controller server 112 may select a partitioning profile based on one or more of the following: the streaming format into which the item will be transcoded, the codec available in client device 102, the player application at client device 102 that will present the item, the type of the item (e.g., video or music file), and the total length of the item.

In one embodiment, according to a partitioning profile the initial portion of the sequence includes a number of rapid start segments having a first length, and the subsequent portion itself is divided into portions with different lengths: the next N (e.g., N=2) segments have a second length that is greater than the first length, the next M (e.g., M=5) segments have a third length greater than the second length, and any other segments in the subsequent portion have a fourth length greater than the third length. For example, two rapid start segments in the initial portion of the sequence may have a length of 2 seconds, the next two segments in the subsequent portion may have a length of 3 seconds, the next five segments may have a length of 4 seconds and remaining segments have a length of 5 seconds.

In one embodiment, according to a profile for every certain number of segments in the sequence, the length of the segments is incremented by a set amount. For example, two rapid start segments in the initial portion of the sequence may have a length of 2 seconds, the next two segments in the subsequent portion may have a length of 3 seconds, the next two may have a length of 4 seconds, and so on up to a maximum length (e.g., 10 seconds). Alternatively, a partitioning profile may define an initial portion with a predetermined number of rapid start segments having a fixed length (e.g., three rapid start segments of 1 second each) and the subsequent portion of the content item is partitioned into longer equal length segments (e.g., 4 seconds each segment).

When controller server 112 receives a request from metadata server 108 to select a transcoding server 114 to transcode one or more segments of a content item from an original format to a streaming format, controller server 112 selects a transcoding server 114 from the multiple available transcoding servers 114 using a load-balancing algorithm. A transcoding server 114 is selected in a way that prevents any one transcoding server 114 from becoming overloaded with transcoding requests. Controller server 112 forwards to selected transcoding server 114 the request received from metadata server 108.

Transcoding servers 114 are a group of load balanced computer servers that transcode content items according to requests issued by metadata server 108 and are one means for performing this function. Transcoding servers 114 transcode from an original format of content items to a streaming format.

Figure 2:
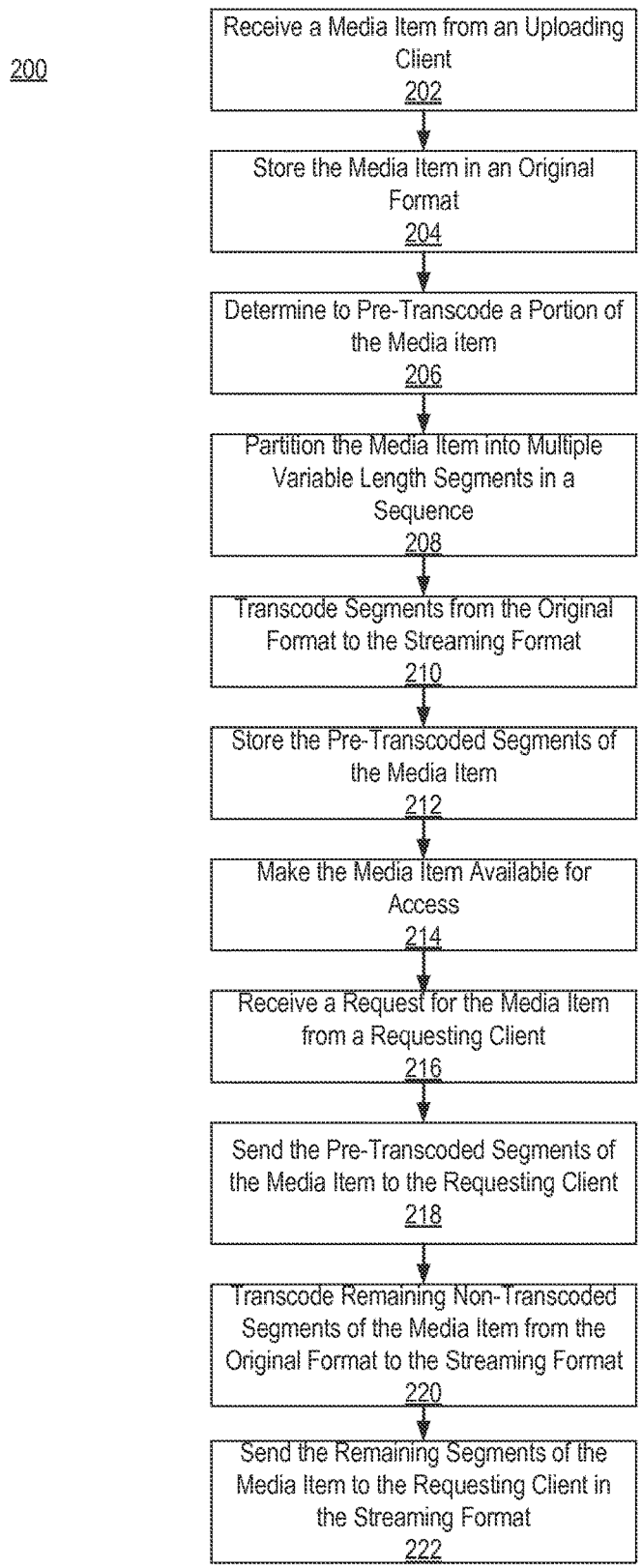
FIG. 2 is a flow chart illustrating the operations of the content management system in storing an uploaded content item and providing the content item to a requesting client device according to one embodiment.

FIG. 2 is a flow chart illustrating the operations of content management system 104 in storing an uploaded content item and providing the content item to requesting client device 102 according to an embodiment where the content item is pre-transcoded. System 104 receives 202 the content item from uploading client device 102. System 104 stores 204 the content item in an original format.

System 104 determines 206 to pre-transcode a portion of the content item. System 104 partitions 208 the content item into multiple variable length segments in a sequence. The content item is partitioned by system 104 according to a partitioning profile. According to the profile a set number of the initial segments in the sequence are rapid start segments that have a length that is less than the length of the other segments in the sequence. System 104 transcodes 210 a certain number of segments in the sequence from the original format to a streaming format. System 104 stores 212 the pre-transcoded segments of the content item in cache 116 and makes 214 the content item available for access.

System 104 receives 216 a request for the content item from requesting client 102. System 104 first sends 218 to requesting client 102 in sequence the pre-transcoded segments of the content item stored in cache 116. During the sending of the pre-transcoded segments, system 104 transcodes 220 from the original format to the streaming format the remaining segments of the item that were not pre-transcoded. System 104 sends 222 to requesting client 102 in sequence the remaining segments in the streaming format.

Figure 3:
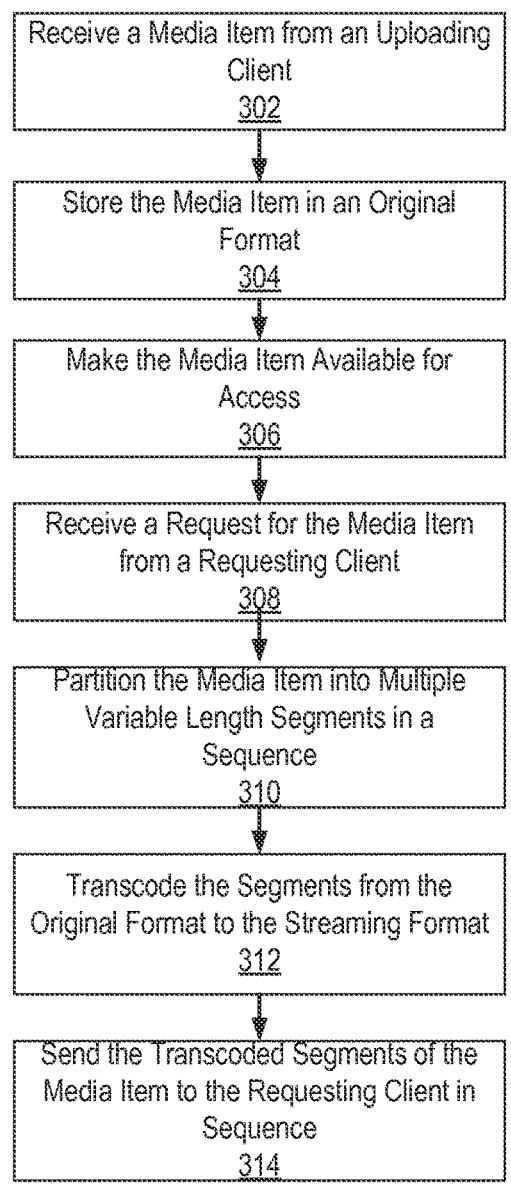
FIG. 3 is a flow chart illustrating the operations of the content management system in storing an uploaded content item and providing the content item to a requesting client device according to an alternate embodiment.

FIG. 3 is a flow chart illustrating the operations of content management system 104 in storing an uploaded content item and providing the content item to requesting client device 102 according to an embodiment where the content item is not pre-transcoded. System 104 receives 302 the content item from uploading client device 102. System 104 stores 304 the content item in an original format and makes 306 the content item available for access.

System 104 receives 308 a request for the content item from requesting client 102. System 104 partitions 310 the stored content item into multiple variable length segments in a sequence. System 104 transcodes 312 the segments of the sequence from the original format to a streaming format. System 104 sends 314 the transcoded segments of the content item to requesting client 102 in sequence.

Those of skill in the art will recognize that other embodiments can perform the steps described above for FIGS. 2 and 3 in different order. Moreover, other embodiments can include different and/or additional steps that the ones described.

ADDITIONAL CONSIDERATIONS

The foregoing described embodiments have been presented for the purpose of illustration; they are not intended to be exhaustive or to limiting to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, described modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may include one or more general-purpose computing devices selectively activated or reconfigured by one or more stored computer programs. A computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Described embodiments may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method, comprising:
partitioning, by a content management system, a content item into a plurality of ordered segments, the plurality of ordered segments including at least one initial segment of a first length and a plurality of segments subsequent to the initial segment, each of the plurality of segments subsequent to the initial segment having a length greater than the first length;
pre-transcoding the initial segment from a first multimedia format to a second multimedia format, wherein the initial segment is less than a total length of the content item;
storing the pre-transcoded initial segment in the second multimedia format;
storing the segments from the plurality of ordered segments subsequent to the first segment in the first multimedia format; and
responsive to receiving a request for the content item from a client device, sending the plurality of ordered segments to the client device, wherein playback of the content item is initiated at the client device upon beginning to receive the plurality of ordered segments.

2. The method of claim 1, wherein the plurality of ordered segments comprise a second segment and a third segment subsequent to the initial segment, wherein the second segment is of a second length greater than the first length and the third segment is of a third length greater than the second length.

3. The method of claim 1, wherein the plurality of ordered segments are sent to the client device according to an order in which the plurality of ordered segments are played by a media player of the client device.

4. The method of claim 1, further comprising:
transcoding the plurality of ordered segments from a non-streaming format to a streaming format, the sent plurality of ordered segments in the streaming format.

5. The method of claim 1, wherein the content item is partitioned according to a partitioning profile selected from a plurality of profiles based on a media player that will play the content item at the client device.

6. The method of claim 1, wherein the content item is partitioned according to a partitioning profile selected from a plurality of profiles based on a total length of the content item.

7. The method of claim 1, wherein the request is received responsive to a requesting user activating a share link shared by a sharing user with the requesting user, the content item associated with an account of the sharing user with the content management system.

8. The method of claim 1, wherein the content item is associated with an account of a requesting user with the content management system and the request is received responsive to the requesting user requesting that the content item be presented.

9. A computer-implemented method, comprising:
partitioning, by a content management system, a video file into a plurality of ordered segments, the plurality of ordered segments including at least one initial segment having a predetermined length and a plurality of segments subsequent to the initial segment, each of the plurality of segments subsequent to the initial segment having a length greater than the predetermined length;
pre-transcoding the initial segment from a first video format to a second video format, wherein the initial segment is less than a total length of the video file;
storing the pre-transcoded initial segment in the second video format;
storing the segments from the plurality of ordered segments subsequent to the initial segment in the first video format;
receiving a request for the video file from a client device;
sending the pre-transcoded initial segment to the client device based on the received request for the video file; and
responsive to sending the initial segment, sending to the client device each of the segments from the plurality of ordered segments subsequent to the initial segment,
wherein presentation of the video file is initiated at the client device upon the client device beginning to receive the plurality of ordered segments.

10. The method of claim 9, wherein the segments from the plurality subsequent to the initial segment vary in length.

11. The method of claim 9, wherein the predetermined length is a smallest length among lengths of the plurality of ordered segments.

12. The method of claim 9, wherein sending the initial segment and each of the segments from the plurality subsequent to the initial segment comprises:
responsive to receiving the request for the video file from the client device:
sending the pre-transcoded initial segment to the client device;
transcoding the segments from the plurality subsequent to the initial segment from the first format to the second format; and
sending to the client device the segments from the plurality subsequent to the initial segment in the second format.

13. A non-transitory computer-readable storage medium having executable computer program instructions for performing operation comprising:
partitioning, by a content management system, a content item into a plurality of ordered segments, the plurality of ordered segments including at least one initial segment of a first length and a plurality of segments subsequent to the initial segment, each of the plurality of segments subsequent to the initial segment having a length greater than the first length;
pre-transcoding the initial segment from a first multimedia format to a second multimedia format, wherein the initial segment is less than a total length of the content item;
storing the pre-transcoded initial segment in the second multimedia format;
storing the segments from the plurality of ordered segments subsequent to the first segment in the first multimedia format; and
responsive to receiving a request for the content item from a client device, sending the plurality of ordered segments to the client device, wherein playback of the content item is initiated at the client device upon beginning to receive the plurality of ordered segments.

14. The computer-readable storage medium of claim 13, wherein the plurality of ordered segments comprise a second segment and a third segment subsequent to the initial segment, wherein the second segment is of a second length greater than the first length and the third segment is of a third length greater than the second length.

15. The computer-readable storage medium of claim 13, wherein the plurality of ordered segments are sent to the client device according to an order in which the plurality of ordered segments are played by a media player of the client device.

16. The computer-readable storage medium of claim 13, further comprising:
transcoding the plurality of ordered segments from a non-streaming format to a streaming format, the sent plurality of ordered segments in the streaming format.

17. The computer-readable storage medium of claim 13, wherein the content item is partitioned according to a partitioning profile selected from a plurality of profiles based on a media player that will play the content item at the client device.

18. The computer-readable storage medium of claim 13, wherein the content item is partitioned according to a partitioning profile selected from a plurality of profiles based on a total length of the content item.

19. The computer-readable storage medium of claim 13, wherein the request is received responsive to a requesting user activating a share link shared by a sharing user with the requesting user, the content item associated with an account of the sharing user with the content management system.

* * * * *